US007035628B2

(12) United States Patent
Rindsberg et al.

(10) Patent No.: US 7,035,628 B2
(45) Date of Patent: Apr. 25, 2006

(54) METHOD AND APPARATUS FOR CONTENT BLOCKING

(75) Inventors: Mark Rindsberg, Boca Raton, FL (US); Paul Marko, Boca Raton, FL (US); Jeffrey Malinsky, Fort Lauderdale, FL (US); Richard Andrew Michalski, Frederick, MD (US)

(73) Assignee: XM Satellite Radio, Inc., Washington, DC (US)

( * ) Notice: Subject to any disclaimer, the term of this patent is extended or adjusted under 35 U.S.C. 154(b) by 480 days.

(21) Appl. No.: 10/039,324

(22) Filed: Dec. 31, 2001

(65) Prior Publication Data

US 2003/0125033 A1 Jul. 3, 2003

(51) Int. Cl.
*H04M 3/00* (2006.01)

(52) U.S. Cl. ...................... 455/418; 455/419; 455/420; 348/722; 348/723; 375/221

(58) Field of Classification Search ................ 455/419, 455/418, 420, 45, 186.1, 507, 517, 524; 358/908; 348/722, 723, 732; 375/221
See application file for complete search history.

(56) References Cited

U.S. PATENT DOCUMENTS

| | | | | |
|---|---|---|---|---|
| 4,750,213 | A * | 6/1988 | Novak | 455/3.01 |
| 5,819,160 | A * | 10/1998 | Foladare et al. | 455/45 |
| 6,393,002 | B1 * | 5/2002 | Paneth et al. | 370/330 |
| 6,477,704 | B1 * | 11/2002 | Cremia | 725/35 |
| 6,553,077 | B1 * | 4/2003 | Rindsberg et al. | 375/260 |
| 6,700,926 | B1 * | 3/2004 | Heikkila et al. | 375/221 |
| 6,748,237 | B1 * | 6/2004 | Bates et al. | 455/553.1 |
| 6,785,656 | B1 * | 8/2004 | Patsiokas et al. | 704/500 |
| 6,865,373 | B1 * | 3/2005 | Tong et al. | 455/63.1 |
| 6,868,112 | B1 * | 3/2005 | Kim et al. | 375/147 |
| 2002/0055343 | A1 * | 5/2002 | Stetzler et al. | 455/260 |
| 2003/0031455 | A1 * | 2/2003 | Sagar | 386/35 |

* cited by examiner

*Primary Examiner*—Danh Cong Le
(74) *Attorney, Agent, or Firm*—Akerman Senterfitt

(57) ABSTRACT

A method of disabling at least a portion of one of a plurality of channels in a digital audio radio system includes the steps of receiving (702) a digitally encoded bit stream over-the-air on the plurality of channels and decoding (704) a selected channel among the plurality of channels. The method further comprises the steps of selectively tagging (706) an undesired type of content on the selected channel, analyzing (708) for an indication of content of the undesired type among the plurality of channels, and selectively disabling (710) at least the portion of the selected channel containing the undesired type of content.

14 Claims, 5 Drawing Sheets

10

500

600

700

METHOD AND APPARATUS FOR CONTENT BLOCKING

CROSS-REFERENCE TO RELATED APPLICATIONS

Ser. No. 10/039,348 "METHOD AND APPARATUS FOR DETERMINING LOCATION IN A SATELLITE COMMUNICATION SYSTEM", concurrently filed on the same date.

FIELD OF THE INVENTION

The invention relates generally to a method and apparatus for controlling channels, and more particularly to a method and apparatus for disabling channels containing undesired content.

BACKGROUND OF THE INVENTION

Parental control systems for television allows parents to lock certain programs or groups of programs based on blocking criteria such as a title, channel, ratings information, content, etc. When a program is locked, the parent could create a parental control personal identification number (PIN). When it is time for the locked program to be broadcast, the system asks the parent to enter the parental control PIN. The system blocks the display of the locked program unless the correct parental control PIN is provided.

Internet service providers such as AOL provide for some form of parental control by allowing parents to create a unique screen name for their child that becomes the child's online identity and e-mail address that enables communication via e-mail, chat, message boards, Instant Messaging, and games. The parent then can select a general level of access for the child. Currently, AOL has three categories for parental control: 1. "Kids Only" for kids 12 years and under that restricts children to certain areas of AOL and the internet accessible via AOL; 2. "Young Teen" for kids between the ages of 13 and 15 provides more freedom than "Kids Only" but does not provide full access to content or interactive features; and 3. "Mature Teen" for kids between that ages of 16 and 17 that allows access to all content on AOL and the internet, except specific sites deemed for adult audiences.

Satellite radio operators are providing digital radio broadcast services covering the entire continental United States. These services offer approximately 100 channels, of which nearly 50 channels in a typical configuration provides music with the remaining stations offering news, sports, talk and data channels. Digital radio may also be available in the near future from conventional analog radio broadcasters that will provide a terrestrial based system using signals co-located in the AM and FM bands.

Satellite radio has the ability to improve terrestrial radio's potential by offering a better audio quality, greater coverage and fewer commercials. Accordingly, in October of 1997, the Federal Communications Commission (FCC) granted two national satellite radio broadcast licenses. The FCC allocated 25 megahertz (MHZ) of the electromagnetic spectrum for satellite digital broadcasting, 12.5 MHz of which are owned by Sirius Satellite Radio and 12.5 MHz of which are owned by the assignee of the present application "XM Satellite Radio Inc."

The system plan for each licensee presently includes transmission of substantially the same program content from two or more geosynchronous or geostationary satellites to both mobile and fixed receivers on the ground. In urban canyons and other high population density areas with limited line-of-sight (LOS) satellite coverage, terrestrial repeaters will broadcast the same program content in order to improve coverage reliability. Some mobile receivers will be capable of simultaneously receiving signals from two satellites and one terrestrial repeater for combined spatial, frequency and time diversity, which provides significant mitigation of multipath interference and addresses reception issues associated with blockage of the satellite signals.

In accordance with XM Satellite Radio's unique scheme, the 12.5 MHZ band is split into 6 slots. Four slots are used for satellite transmission. The remaining two slots are used for terrestrial reinforcement.

In accordance with the XM frequency plan, each of two geostationary satellites transmits identical or at least similar program content. The signals transmitted with QPSK modulation from each satellite (hereinafter satellite 1 and satellite 2). For reliable reception, the LOS signals transmitted from satellite 1 are received, reformatted to Multi-Carrier Modulation (MCM) and rebroadcast by terrestrial repeaters. The assigned 12.5 MHZ bandwidth (hereinafter the "XM" band) is partitioned into two equal ensembles or program groups A and B. Each ensemble is transmitted by each satellite on a separate radio frequency (RF) carrier. Each RF carrier can support 50 channels or more of music, talk or data in Time Division Multiplex (TDM) format.

Thus, in a digital audio radio system such as the system described above, a need exists for a device that enables a user to intelligently disable channels or portions of channels containing undesired content among the many channels that are available. A need further exists for a feature in such a system that gives the user an easy way to disable or enable the undesired type of content.

SUMMARY OF THE INVENTION

In a first aspect of the present invention, a method of content blocking in a digital audio radio comprises the steps of selectively choosing to skip undesired content on at least a portion of a channel, communicating an indicia of the undesired content to a central station, and receiving a signal over-the-air from the central station that disables the undesired content in the digital audio radio.

In a second aspect of the present invention, a method of disabling at least a portion of one of a plurality of channels in a digital audio radio system comprises the steps of receiving a digitally encoded bit stream over-the-air on the plurality of channels and decoding a selected channel among the plurality of channels. The method further comprises the steps of selectively tagging an undesired type of content on the selected channel, analyzing for an indication of content of the undesired type among the plurality of channels, and selectively disabling at least the portion of the selected channel containing the undesired type of content.

In a third aspect of the present invention, a digital audio radio capable of disabling at least a portion of a channel comprises a receiver, a decoder, an input, and a processor. The receiver preferably receives a digitally encoded bit stream over-the-air having a plurality of channels, wherein at least a portion of the plurality of channels contains content and associated channel information. The decoder preferably selectively decodes at least a portion of the plurality of channels and the associated channel information. The input enables the selective storage of descriptors associated with undesired content on at least one of the plurality of channels into a memory. Finally, the processor is preferably programmed to compare the selectively stored descriptors with the associated channel information and further programmed to disable at least the portion of the channel containing undesired content when at least a portion of the selectively stored descriptors matches the associated channel information.

In a fourth aspect of the present invention, a digital audio radio capable of disabling at least a portion of a channel comprises a receiver, a user interface and a processor. The receiver receives the plurality of channels via a digitally encoded bit stream over-the-air, wherein at least a portion of the plurality of channels contains content and associated channel information. The user interface enables a user to selectively choose at least the portion of the channel containing the undesired channel and the processor is preferably programmed to disable at least the portion of the channel in response to a user input via the user interface.

In a final aspect of the present invention, a digital audio radio capable of disabling at least a portion of a channel comprises a receiver for receiving the plurality of channels via a digitally encoded bit stream over-the-air, means for selectively choosing to skip undesired content on at least a portion of a channel and a processor. The processor is preferably programmed to communicate an indicia of the undesired content to a central station and to disable at least the portion of the channel in response to receipt of a signal over-the-air from the central station that disables the undesired content in the digital audio radio.

DETAILED DESCRIPTION OF THE DRAWINGS

Figure 1:
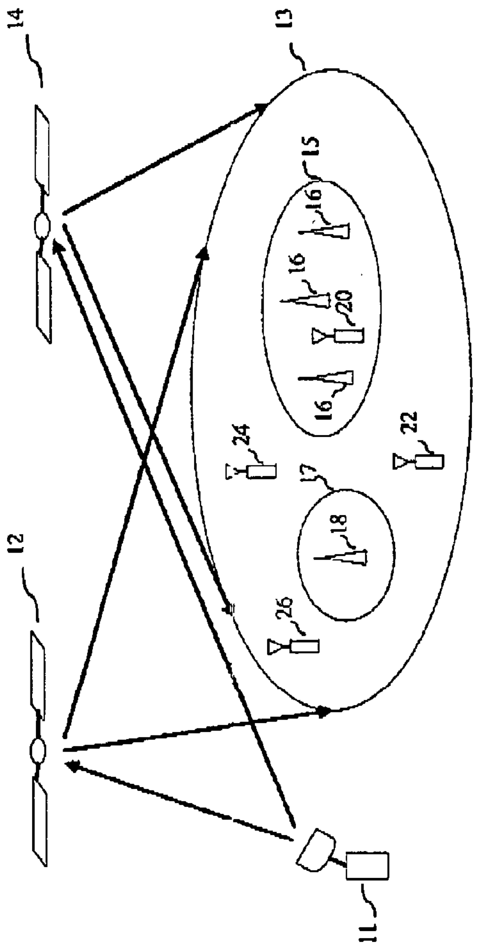
FIG. 1 illustrates a Satellite digital audio radio service system architecture in accordance with the present invention.

Referring to FIG. 1, satellite radio operators are providing digital radio service to the continental United States. Briefly, the service provided by XM Satellite Radio includes a satellite X-band uplink (11) to two satellites (12 and 14) which provide frequency translation to the S-band for retransmission to radio receivers (100, 20, 22, 24, and 26) on earth within the coverage area (13). Radio frequency carriers from one of the satellites are also received by terrestrial repeaters (16 and 18). The content received at the repeaters is retransmitted at a different S-band carrier to the same radios (20) that are within their respective coverage areas (15 and 17). These terrestrial repeaters facilitate reliable reception in geographic areas where LOS reception from the satellites is obscured by tall buildings, hills, tunnels and other obstructions. The signals transmitted by the satellites (12 and 14) and the repeaters are received by SDARS receivers (20–26) as well as receiver unit (100). As depicted in FIG. 1, the receivers may be located in automobiles, in handheld or in stationary units for home or office use. The SDARS receivers are designed to receive one or both of the satellite signals and the signals from the terrestrial repeaters and combine or select one of the signals as the receiver output.

Figure 2:
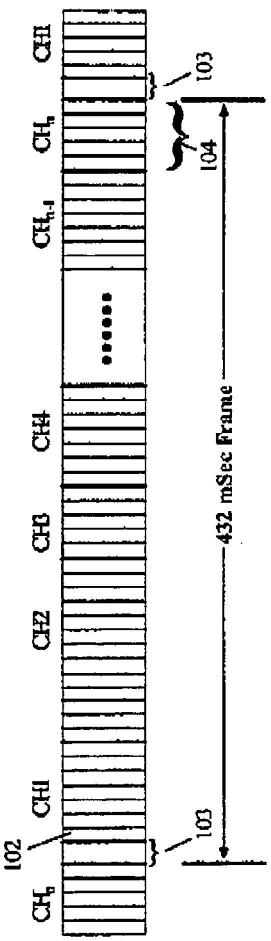
FIG. 2 is a block diagram illustrating a terrestrial based digital audio radio service system architecture in accordance with the present invention.

Referring to FIG. 2, a terrestrial based radio communication system 200 is shown in accordance with present invention. The system 200 preferably comprises a transmission station 202 that transmits signals similar to the repeater stations described above or alternatively could be other transmission formats such as FM, or other modulation techniques suitable for transmission of digital audio. The transmission station 202 is preferably coupled to or forms part of a central station. Although the central station may be co-located with the transmission station 202, central station could be located remotely from the transmission station 202 or from a plurality of transmission stations. The system 200 also preferably includes a plurality of receiver units (100 and 110 for example) each preferably having a receiver 203, memory 210 and 212 preferably containing a channel reference table and a desired content descriptor list respectively, a controller 204, a user input/output 214 (such as keypads and displays), and a radio frequency to audio converter 206 for playing audio via speaker 208. The receiver unit 100 may optionally include a transmitter 216 to allow transmission of data on a reverse channel back to the central station. The reverse channel can be received by a receiver co-located at the transmission station 202 or by other base receivers (not shown) in the system 200. The receiver unit 100 may further optionally include a GPS receiver unit 217 coupled to a controller 205 for providing location information as will be further described below.

Operationally, the receiver unit 100 can function in a variety of ways in accordance with the present invention. In one embodiment, the receiver 203 receives a digitally encoded bit stream over-the-air having a plurality of channels, wherein at least a portion of the plurality of channels contains content and associated channel information. The receiver unit also preferably comprises a decoder 204 for selectively decoding at least a portion of the plurality of channels and associated channel information. The user input/output 214 enables a user to selectively store descriptors associated with undesired content on at least one of the plurality of channels into a memory such as memory 212. The receiver unit should also comprise a processor such as controller 205 programmed to compare the selectively stored descriptors with the associated channel information and further programmed to disable the at least one of the plurality of channels or at least a portion of a channel containing undesired content when at least a portion of the selectively stored descriptors matches the associated channel information. It should be understood within contemplation of the present invention that the "disabling" can mean disabling a portion or portions of a single channel, a portion or portions of multiple channels, or disabling of one or more channels, or disabling any combination thereof. It should also be understood within contemplation of the present invention that "matches" or "matching" could mean an exact match, or a substantial match, or a meeting (or not meeting as the case may be) of a condition determined by the stored descriptor. For example, storage of a descriptor for a location could "match" a different descriptor that is in the same region or within a predetermined distance of the stored descriptor. Likewise, a stored descriptor for "Adults Only" would "match" a received descriptor for "Kids Only" or "All Audiences". The processor is further preferably programmed to re-enable the portion of the channel containing undesired content when at least a portion of the selectively stored descriptors no longer matches the associated channel information or no longer matches a condition set by the stored descriptor(s). Re-enabling (having a comparable interpretation to "disabling" as described above) could occur by either the user selectively removing the descriptors and/or an update to associated channel information such that a match no longer exists with the selectively stored descriptor(s) or such that a blocking or disabling condition no longer exists. The associated channel information can be broadcast on a separate broadcast information channel that is transmitted and updated frequently to provide the user with up-to-date information about the plurality of channels. Alternatively, the information in the broadcast information channel can be distributed among the respective plurality of channels in respective auxiliary data fields for example.

With respect to the GPS receiver 217 in FIG. 2 or other location determination means such as those described in a patent application entitled "METHOD AND APPARATUS FOR DETERMINING LOCATION IN A SATELLITE COMMUNICATION SYSTEM" (assigned to the assignee herein and hereby incorporated by reference), the digital audio radio could utilize the location information obtained from the GPS receiver 217 or other location determination means to automatically block or disable content on at least a portion of a channel or channels in a certain geographic area. Geographically based disabling would be particularly useful in instances where a local sporting event is blacked-out in a region (typically due to contractual arrangements requiring minimum attendance or minimum sale of tickets at the local sporting event) or where a terrestrial station such as an FM station has exclusive rights to content for a particular area. Thus, on a theoretical level, the present invention would enable satellite broadcasting companies to comply with contractual arrangements requiring the blocking of certain content by narrowly tailoring the blocking conditions without disabling other content on the same channel or other channels.

In another embodiment of the present invention, a digital audio radio such as receiver unit 100 simply comprises the receiver 203 for receiving the plurality of channels via a digitally encoded bit stream over-the-air, the user interface 214 coupled to the receiver and enabling a user to selectively choose at least undesired content on a channel or a portion of a channel and a processor such as controller 204 programmed to disable at least the portion of the channel containing the undesired content in response to a user input via the user interface. In this embodiment, the portion of the channel is disabled at the receiver unit, but alternatively the receiver unit may further have a transmitter 216 for communicating an indicia of the undesired content to a central station on a reverse channel. In this way, the processor would be programmed to disable the portion of the channel containing the undesired content in the digital audio radio only after receiving a signal over-the-air from a central station to the digital audio receiver. This signal over-the-air from the central station could be an acknowledgment signal for example.

It should be understood within contemplation of the present invention as set forth in the claims that a channel may contain several portions having different types of content having their own respective descriptors. For example, a single channel in the XM system could send an image (such as JPEG data), audio, text, or other data on the same channel. It is certainly possible that the descriptors associated with each type of content could vary drastically. For example, the ratings on the image could be rated "all audiences" and the audio and text on the same channel could be rated "adults only". Thus, a receiver as contemplated herein could be programmed in a "kids only" mode in various ways to only output the image via a display in the user interface 214 without the audio and text or to completely block the channel. Alternatively, another programmed mode could allow a user to tune to the channel and output all the content (image, audio, text or other data) when at least a portion of the content is acceptable. Thus, various iterations and permutations of the idea as similarly described above are contemplated herein.

Figure 3:
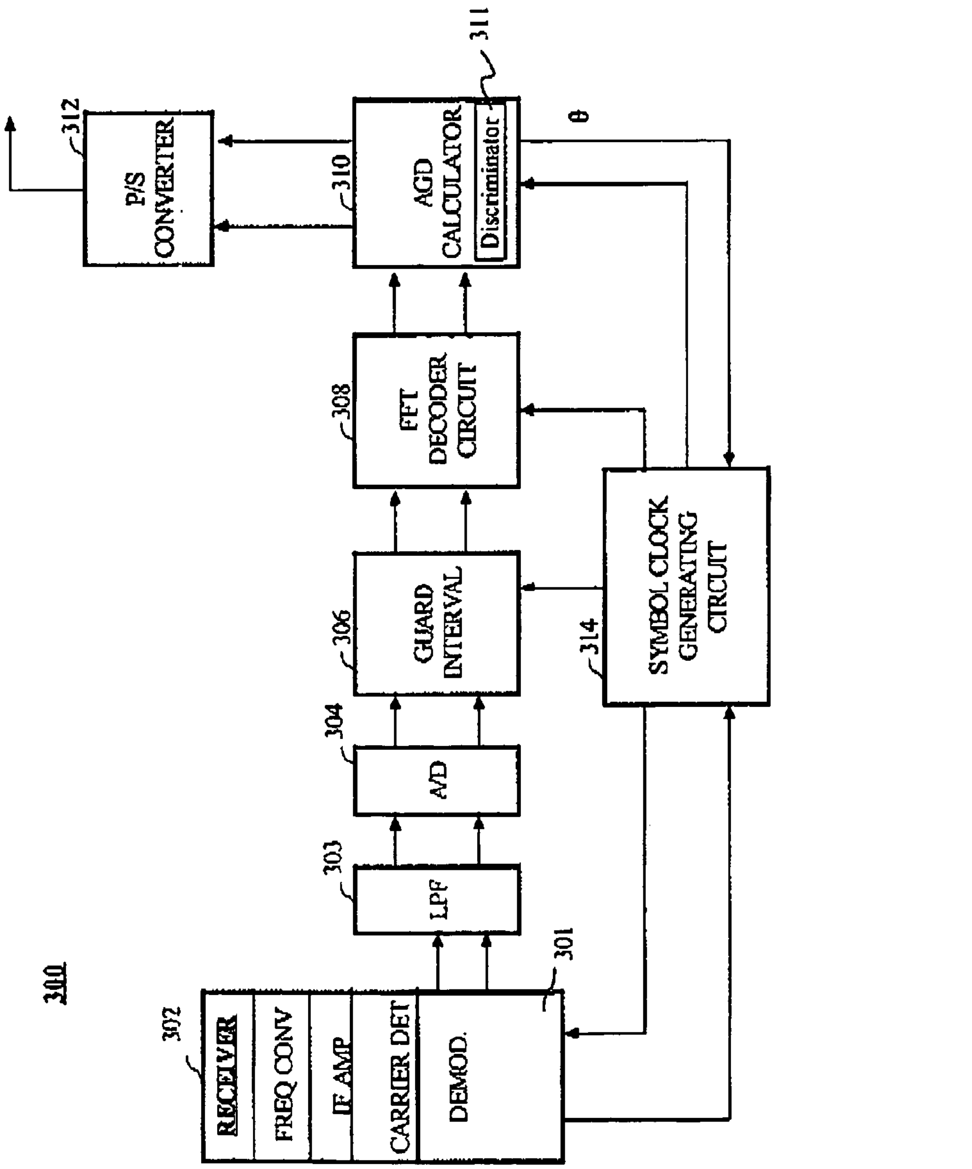
FIG. 3 is a diagram illustrating a representative bit stream in a frame format for distributing data in accordance with the present invention.

Referring to FIG. 3, a plurality of communication resource channels (Channel 1 through n) are shown in accordance with the present invention. In this instance, the over-the-air protocol frame format 300 of the XM Satellite Radio system is shown. This frame format 300 is based on a 432 millisecond frame as shown in FIG. 3 where each frame is subdivided into 8 kilobit per second sub-channels 102. These sub-channels 102 can be dynamically grouped to form higher bit rate payload channels 104. The payload channel or communication resource 104 provides the necessary bandwidth to transport a high-quality digital audio signal to the listener as well as other data as will become more apparent. When a listener changes channels, a receiver in accordance with the present invention simply extracts a different payload channel from the frame 300. It should be noted that each receiver in the XM Satellite System has a unique identifier allowing for the capability of individually addressing each receiver over-the-air to enable or disable services or to provide custom applications such as individual data services or group data services. The frame may also include a broadcast information channel and/or an Electronic Program Guide among channels 1–n which contains information about the remaining channels in the frame. Such information can include descriptors such as song title, artist, composer, lyricist, label, album name, genre (e.g., Latin), sub-genre (e.g., Salsa), length, lyric keywords, tier level, or ratings (the ratings could be similar to the ratings used to rate motion pictures or any other rating scheme may be used) or any combination thereof. Alternatively, each of the channels in the frame can contain such descriptors for its respective channel in an auxiliary data field for example.

Figure 4:
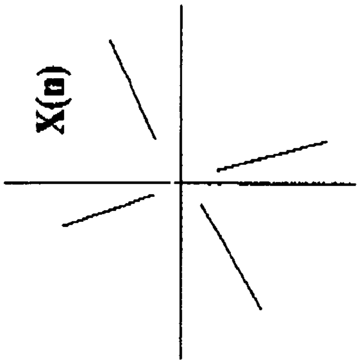
FIG. 4 is another diagram illustrating a typical digital radio broadcast transmission in accordance with the present invention.
Figure 4A:
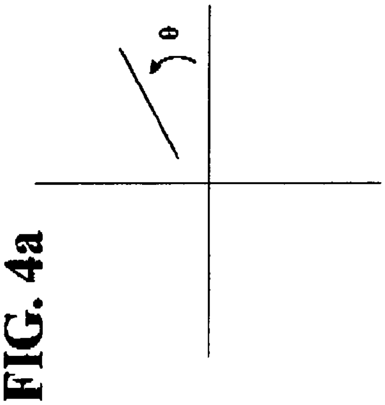

Referring to FIG. 4, an illustration of a typical live radio broadcast transmission 400 is shown composed of various content segments representing music (in segments 402 and 404), live talk (segment 406), and information (segment 408) as examples. Each of these segments could have associated descriptors as described above.

Figure 5:
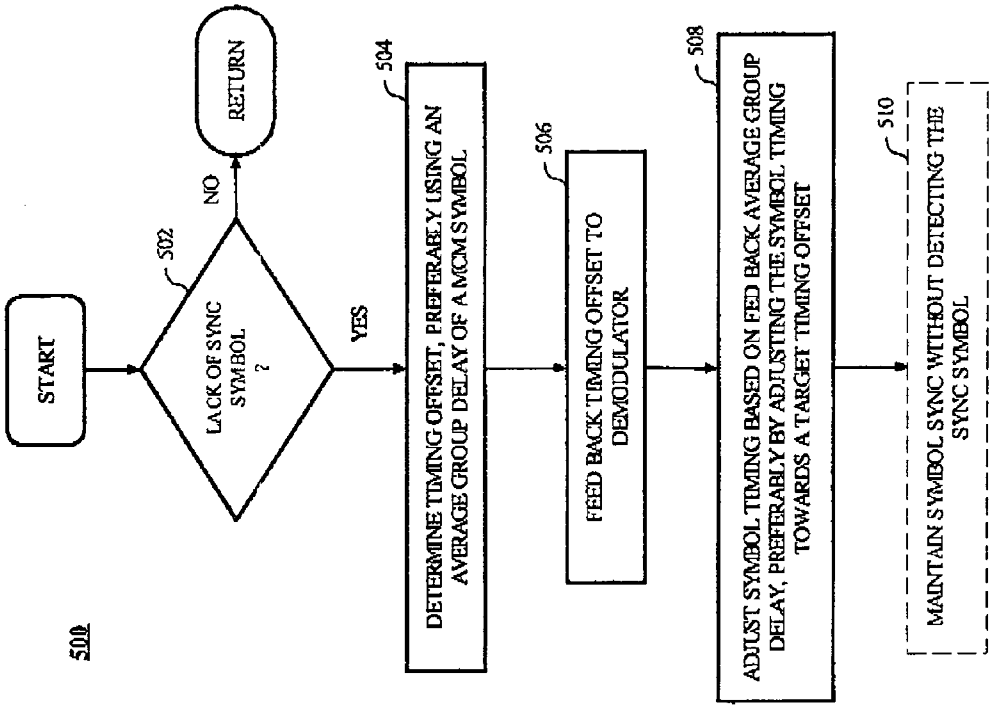
FIG. 5 is a block diagram of a radio receiver unit with storage media in accordance with the present invention.

Referring to FIG. 5, a block diagram of a typical subscriber radio or receiver unit 100 in accordance with the present invention is shown in greater detail. The receiver unit 100 preferably comprises a receiver 502 and storage media or memory 510 used to selectively store descriptors corresponding to a portion of the plurality of channels containing undesired content. In other words, the storage media or memory 510 preferably stores an undesired content database 512 that has for example descriptors associated with content from a user selected channel. Alternatively, the memory 510 could contain descriptors for undesired content that are pre-stored in the radio rather than user selected (such as in a "kids only" radio. The descriptors could simply be the channel number itself, but can include any number of other descriptors as described previously such as a maturity rating, tier level, song title, artist, talk show host, or talk show guest for example. Another memory 504 preferably stores associated channel information or a channel reference table that is preferably updated whenever receiving updated information in a current frame. The RF to audio converter block 506 provides access to the real-time over the air content segments. A system controller 508 enables the routing of information and audio to the user, either visually through a display 518 or audibly through an audio output device 514 such as a speaker The receiver unit 100 may also have a front panel 519 that contains the display 518 and optionally a keypad 516 for user input. In accordance with one aspect of the present invention, the receiver unit 100 may also include a single button or keypad 517 that would allow a user to input their preferences in the type of content by a single key press. For example, if the user is listening to OutKast's "Stankonia" on a channel 3, a single button press could enter descriptors into memory 510 indicating that the user prefers not to listen to music by OutKast or to music having a similar rating as this particular music title for example. To prevent further tampering of the user's instructions in this regard, the keypad 516 can optionally be used to enter a personal identification number (PIN) such that only the user having the PIN can change the descriptors stored in the undesired content database 512. Of course, it should be understood within contemplation of the present invention that access or authority to change the descriptors could be protected in a number of other ways besides using a PIN.

Figure 6:
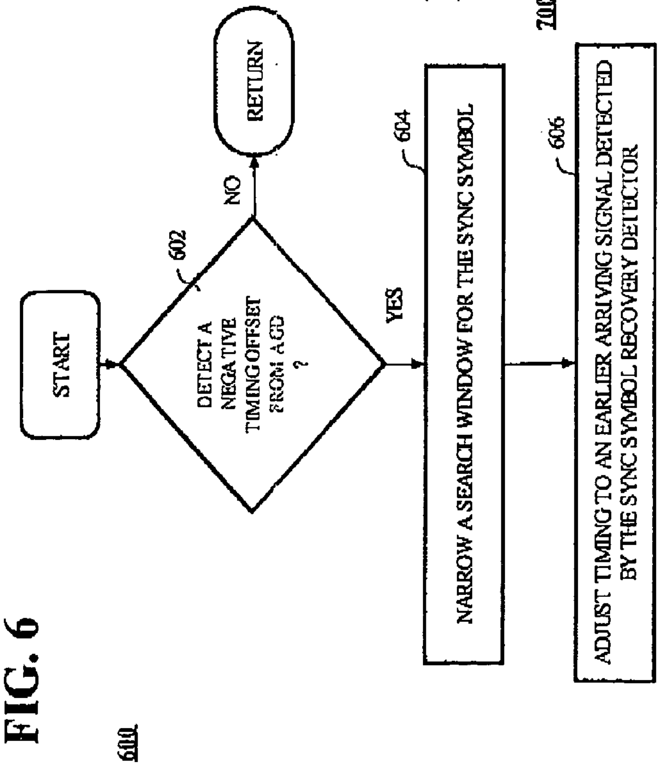
FIG. 6 is a chart illustrating a channel reference table in accordance with the present invention.

Referring to FIG. 6, a chart illustrating a channel reference table in accordance with the present invention is shown. As illustrated, the channel reference table can contain updated information that could be compared with a user's stored preference (or lack thereof) in music or other listening choices. For example, the channel reference table can contain (depending on memory) descriptors relating to current or upcoming artist, song title, album name, tier level, genre, sub-genre, lyric keywords, talk show host, talk show guest, talk show theme, rating, or data type (such as image, text, audio, video, financial, weather, sports, or traffic) or even location information. It should be understood within contemplation of the present invention that a similar effect of channel blocking or disabling could be achieved if the receiver was programmed to only play channels that matched descriptors on a "desired content database" (not shown).

Figure 7:
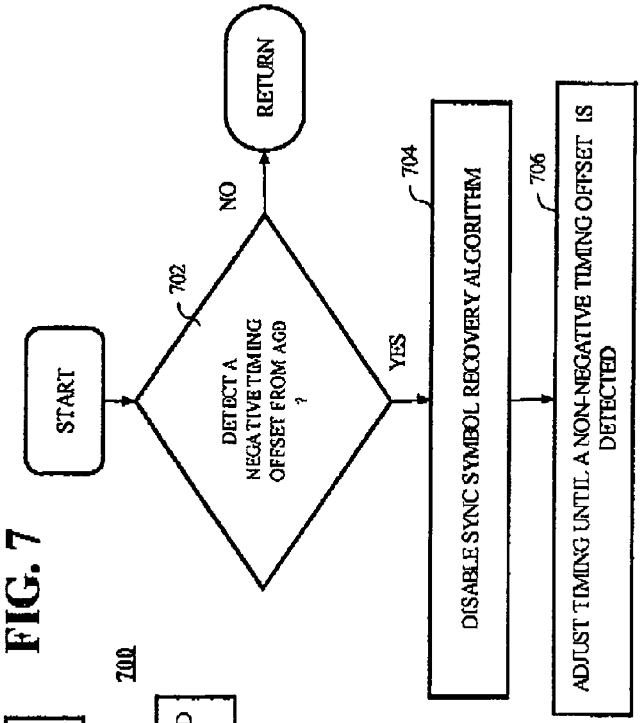
FIG. 7 is a flowchart illustrating a method in accordance with the present invention.

Referring to FIG. 7, a flow chart illustrating a method 700 of disabling at least one of a plurality of channels in a digital audio radio system is shown. At step 702 a digitally encoded bit stream is received over-the-air on a plurality of channels, wherein the digitally encoded bit stream is preferably a satellite digital audio radio system (SDARS) signal containing the plurality of channels. It should be understood to be under the scope of the present invention that the bit stream could also be a digital audio radio signal transmitted by other means such as terrestrial FM stations. Then at step 704 the method proceeds by selectively decoding a selected channel among the plurality of channels. At step 706, selectively tagging an undesired type of content on the selected channel. The step of tagging preferably comprises the step of storing a descriptor or descriptors as previously described in a memory containing an undesired content database. At step 708, the method proceeds to analyze a broadcast information channel and/or an Electronic Program Guide for an indication of content of the undesired type, preferably by comparing a stored descriptor(s) in memory with a descriptor(s) in a broadcast information channel and/or an Electronic Program Guide for an indication of content of the undesired type among the plurality of channel. Preferably, the broadcast information channel and/or Electronic Program Guide is updated frequently to present the user with the most up-to-date content information about the plurality of channels. It should also be understood that the analysis could compare stored location information determined at the radio (using GPS information or other location determining means) with location information that may be sent on the broadcast information channel or Electronic Program Guide.

At step 710, the user is able to selectively disable portions of channels containing an indication of the content of the undesired type or alternatively the portions are automatically and selectively disabled utilizing location information. Ideally, as shown in steps 712 and 714, such channels will be disabled and re-enabled as a memory for example containing a channel reference table is updated with matching or non-matching descriptors (from the broadcast information channel or Electronic Program Guide or a location determining source) as long as the receiver remains in this mode.

Figure 8:
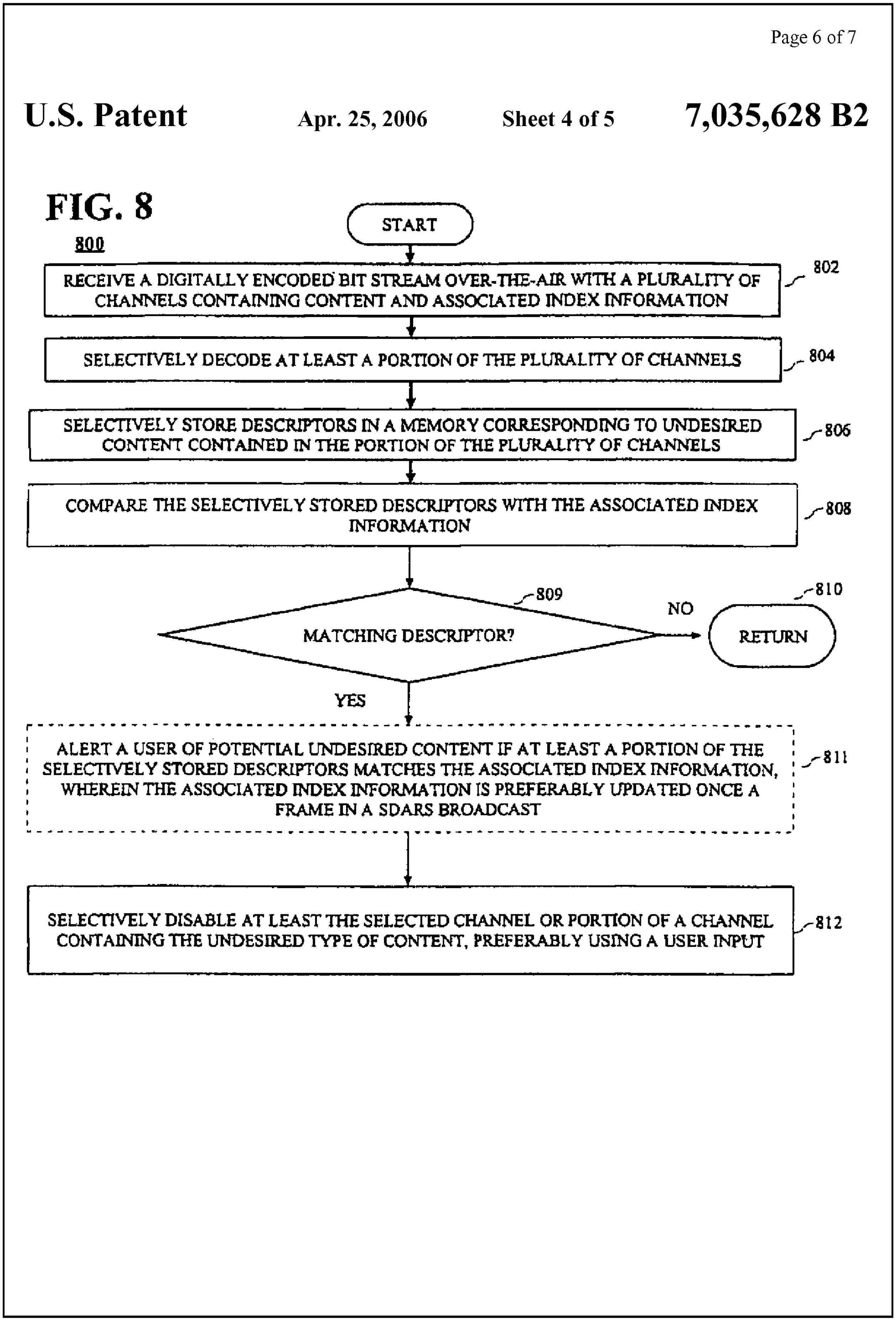
FIG. 8 is a flowchart illustrating another method in accordance with the present invention.
Figure 9:
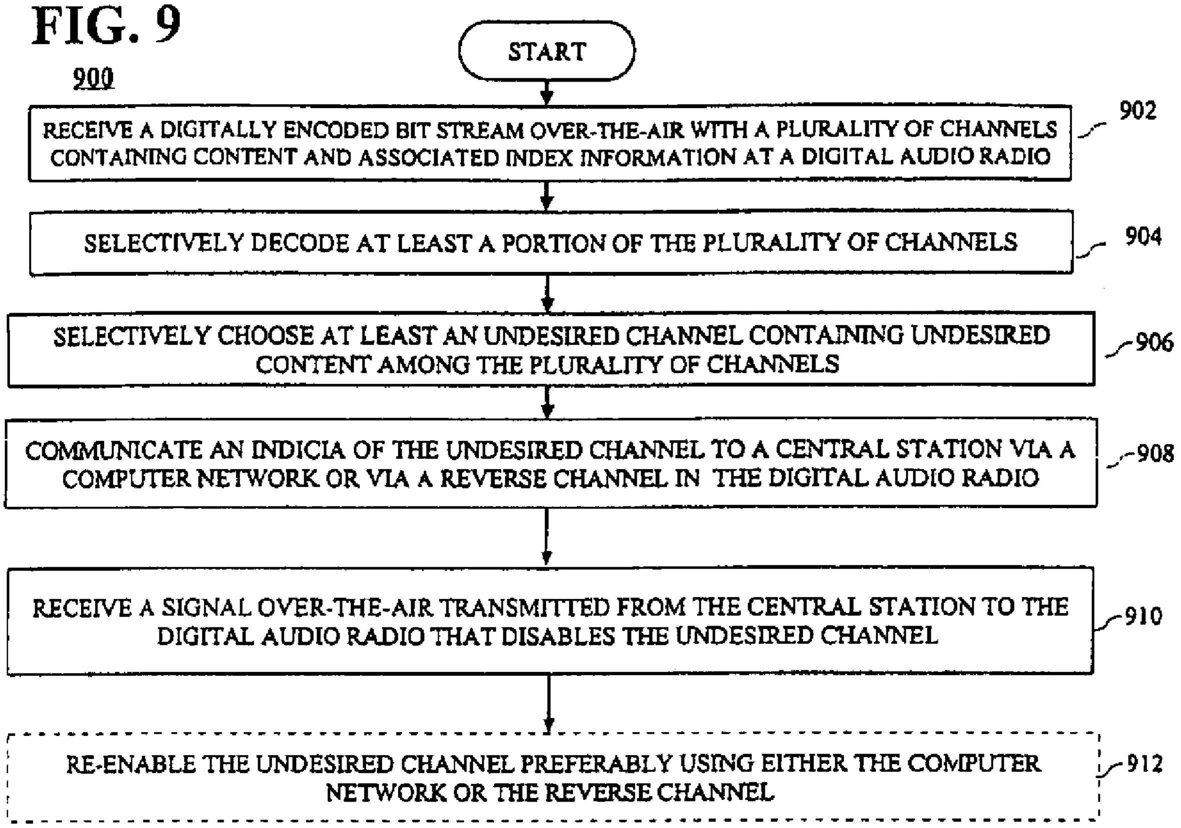

Referring to FIG. 8, a flow chart illustrating another method 800 in accordance with the present invention is shown. At step 802 a digitally encoded bit stream is received over-the-air on a plurality of channels, wherein each of the plurality of channels contains content and associated channel information. Then at step 804 the method proceeds by selectively decoding at least a portion of the plurality of channels. At step 806, descriptors are selectively stored in a memory, wherein the descriptors correspond to undesired content contained in the portion of the plurality of channels. At step 808, the method proceeds to compare the selectively stored descriptor or descriptors with the associated channel information. At decision block 809, it is determined if there are any stored descriptors that match descriptors in the associated channel information. If no descriptors match, then the method returns to normal programming at block 810. If at least one descriptor matches, then a user can optionally be alerted of potential undesired content on a given channel at step 811. At step 812, at least a portion of the selected channel containing the undesired typed of content can be selectively disabled preferably using a user input. Of course, the step above could also cause the disabling of portions of all channels or the disabling of all channels containing the undesired type of content automatically if desired.

Figure 9:
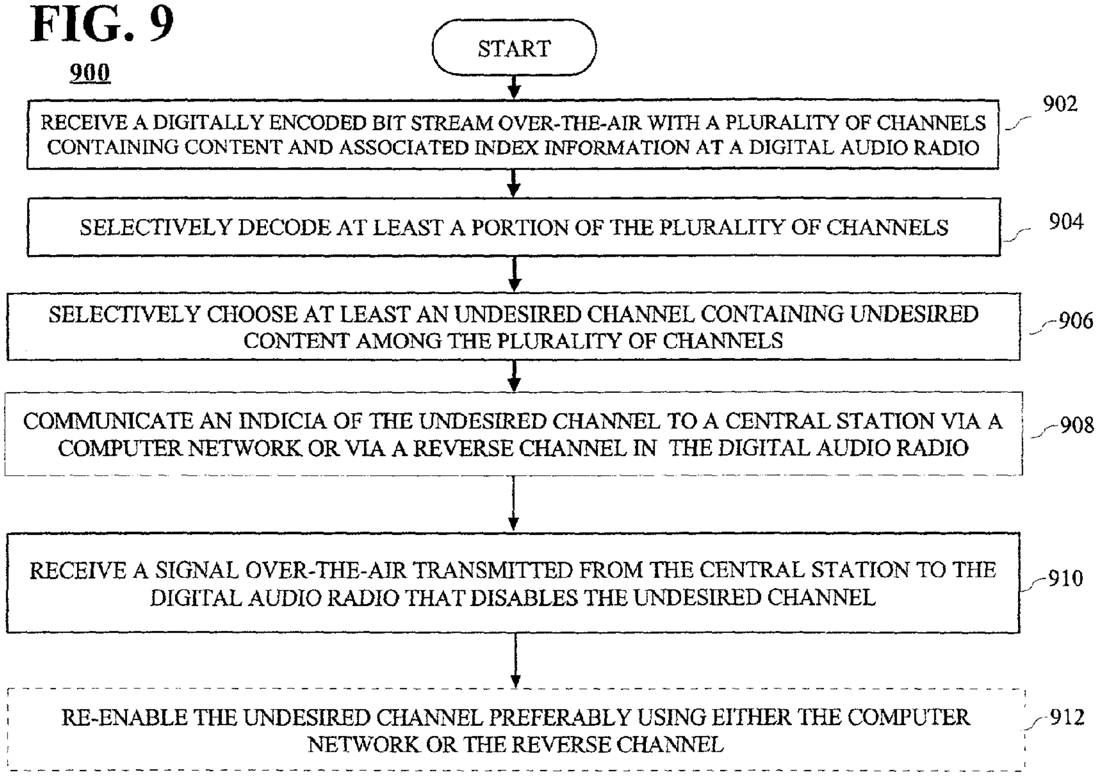
FIG. 9 is a flowchart illustrating another method in accordance with the present invention.
Figure 1:
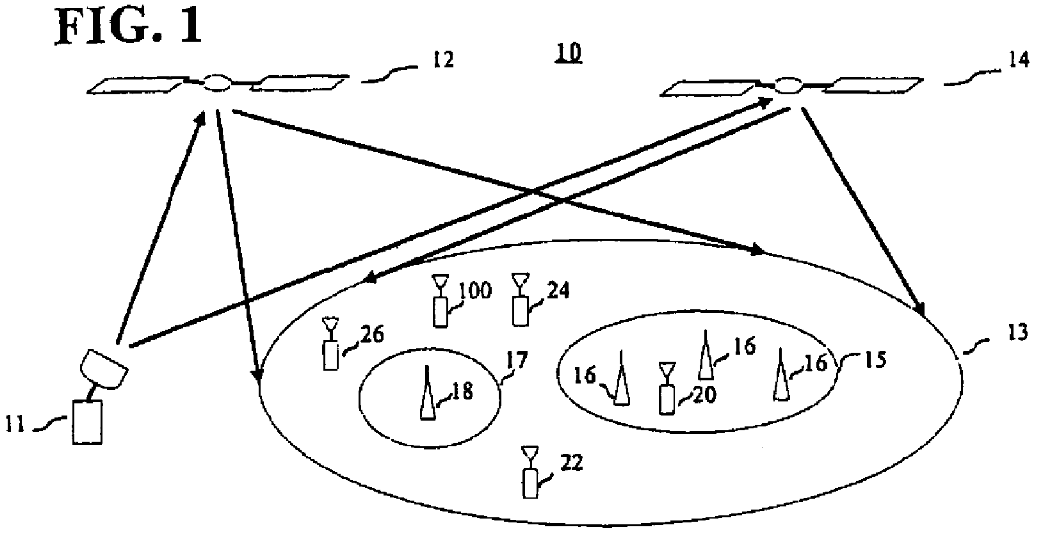
Figure 2:
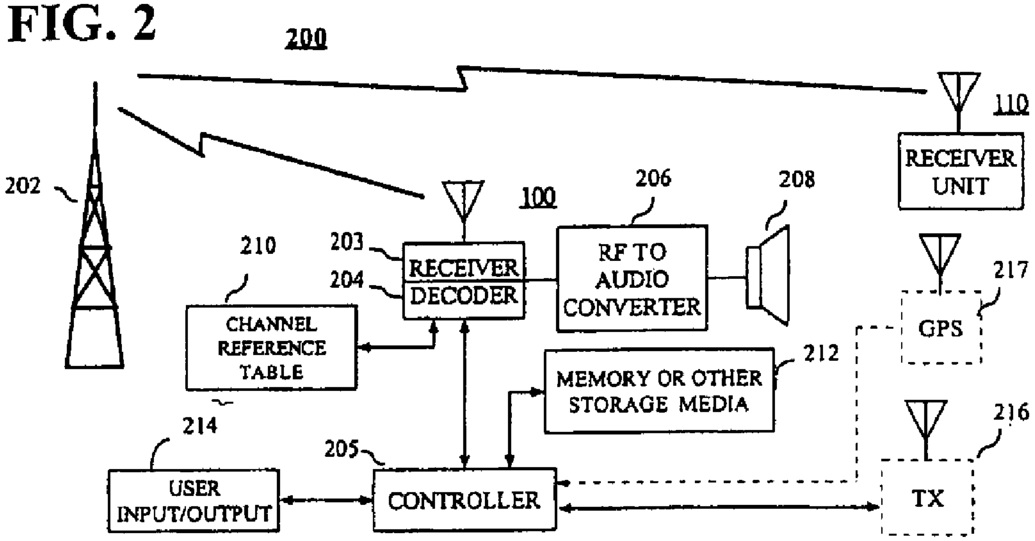
Figure 3:
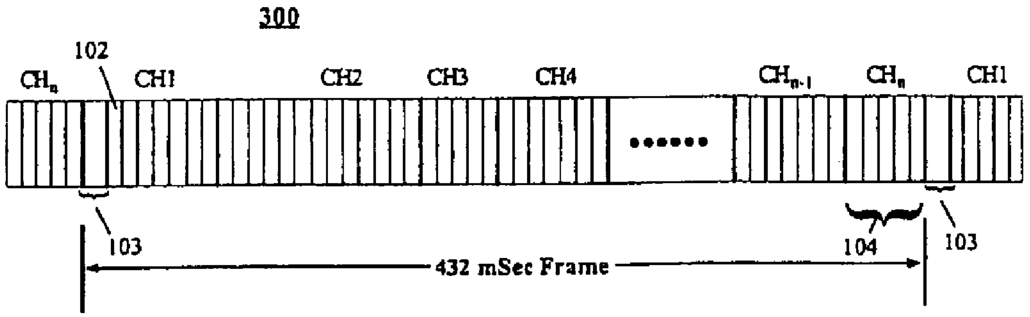
Figure 7:
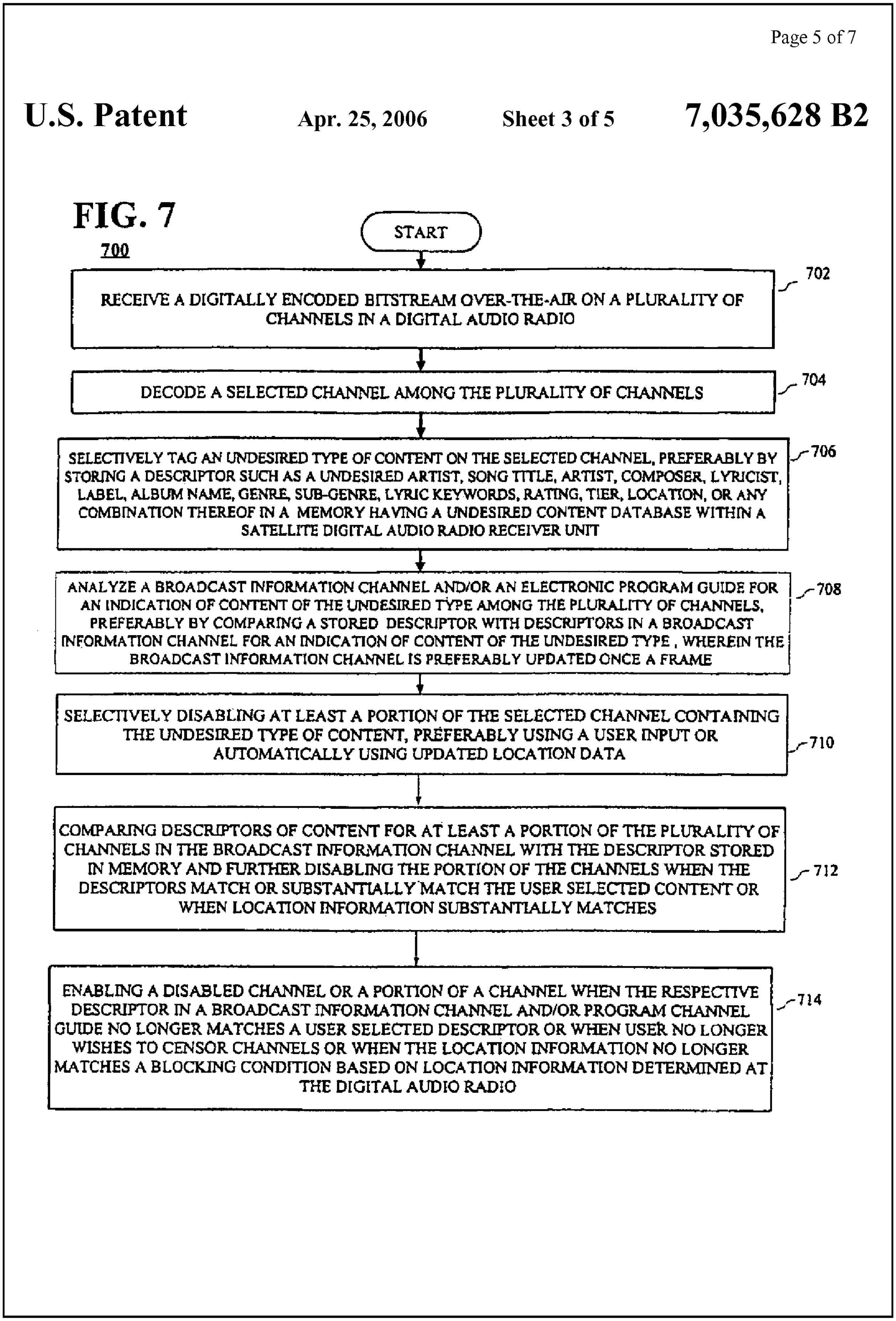

Referring to FIG. 9, a flow chart illustrating yet another method 900 in accordance with the present invention is shown. At step 902 a digitally encoded bit stream is received over-the-air on a plurality of channels, wherein each of the plurality of channels contains content and associated channel information. Then at step 904 the method proceeds by selectively decoding at least a portion of the plurality of channels. At step 906, at least one undesired channel containing undesired content is selectively chosen. At step 908, an indicia of the undesired channel is communicated to a central station via a computer network or via a reverse channel in the digital audio radio. The indicia can simply be the undesired channel or can be any number of the descriptors previously discussed above. When communicating via a computer network to the central station, the user could essentially be at a computer terminal (apart from the radio) and entering data onto a website associated with the central station that is transmitting the digitally encoded bit stream to the radio. The radio could also have a reverse channel and/or a web browser allowing access to the website mentioned above from the radio itself. At step 910, the method proceeds by receiving a signal over-the-air transmitted from the central station to the digital audio radio that causes the channel or portion of the channel containing the undesired content to become disabled. In this manner, if desired, much of the storage and processing associated with matching descriptors can be done at a central station rather than at a mobile digital audio radio. If desired, such processing can occur at both the central station and the radio in a synchronized manner. At step 912, the radio should optionally be able to re-enable the disabled channel or portion of the channel once again preferably using either the computer network or the reverse channel using a transmitter within the radio.

The description above is intended by way of example only and is not intended to limit the present invention in any way except as set forth in the following claims.

We claim:

1. A method of content blocking in a digital audio radio on at least a portion of one of a plurality of channels, comprising the steps of:

receiving a digitally encoded bit stream over-the-air on the plurality of channels;

selectively choosing to skip undesired content on at least a portion of a channel by storing a code representative of the undesired content in a memory of the digital audio radio, wherein the code stored is representative of a location and wherein the code representative of the location is updated via a GPS receiver or other location determination means utilizing time delays;

communicating an indicia of the undesired content to a central station;

receiving a signal over-the-air from the central station that disables the undesired content in the digital audio radio; and blocking the output of the content by disabling the portion of the channel by comparing the code with a second code embedded in the signal from the central station.

2. The method of claim 1, wherein the method further comprises the step of blocking the output of the content by disabling at least the channel completely.

3. The method of claim 1, wherein the steps of selectively choosing and communicating the indicia of the undesired content to the central station is achieved via a computer network.

4. The method of claim 3, wherein the step of selectively choosing and communicating the indicia comprises selecting a profile for a particular user on a website coupled to the central station.

5. The method of claim 3, wherein the indicia communicated to the central station is selected from the group comprising a location, a song title, an artist's name, a band name, a channel number, an album, a rating, a tier level, or an identification number associated with the digital audio radio.

6. The method of claim 1, wherein the step of selectively choosing is achieved via a user interface in the digital audio radio and the step of communicating the undesired content to the central station is achieved via a reverse channel to the central station.

7. A method of content blocking in a digital audio radio on at least a portion of one of a plurality of channels, comprising the steps of:

receiving a digitally encoded bit stream over-the-air on the plurality of channels;

selectively choosing to skip undesired content on at least a portion of a channel;

communicating an indicia of the undesired content to a central station;

receiving a signal over-the-air from the central station that disables the undesired content in the digital audio radio;

decoding a selected channel among the plurality of channels;

selectively tagging an undesired type of content on the selected channel;

analyzing a broadcast information channel and/or an Electronic Program Guide for an indication of content of the undesired type among the plurality of channels; and selectively disabling at least the portion of the selected channel containing the undesired type of content.

8. The method of claim 7, wherein the step of selectively disabling further comprises the step of selectively disabling all channels among the plurality of channels containing the indication of content of the undesired type.

9. The method of claim 7, wherein the step of tagging further comprises the step of storing descriptors representative of the content on the selected channel in a memory.

10. The method of claim 9, wherein the step of analyzing further comprises the step of comparing descriptors of content for at least a portion of the plurality of channels in the broadcast information channel with the descriptor stored in the memory.

11. The method of claim 7, wherein the indication of undesired content comprises descriptors selected from the group comprising song title, artist, composer, lyricist, label, album name, genre, sub-genre, length, lyric keywords, audience level rating, service tier level, location, or any combination thereof.

12. The method of claim 7, wherein the step of selectively tagging comprises the step of storing a descriptor such as a undesired artist or song from a channel reference table and/or an Electronic Program Guide in a memory or other storage media within a satellite digital audio radio receiver unit and the step of analyzing further comprises comparing the descriptor with descriptors in a broadcast information channel for an indication of content of the undesired type among the plurality of channels, wherein the broadcast information channel is updated frequently to provide the user with up-to-date information about the plurality of channels.

13. The method of claim 7, wherein the method further comprises the step of selecting the undesired content by a single user input.

14. The method of claim 7, wherein the step of disabling comprises the step of disabling a time division channel among a plurality of time division channels received at a digital audio radio.

* * * * *

UNITED STATES PATENT AND TRADEMARK OFFICE

CERTIFICATE OF CORRECTION

PATENT NO. : 7,035,628 B2
APPLICATION NO. : 10/039324
DATED : April 25, 2006
INVENTOR(S) : Rindsberg et al.

It is certified that error appears in the above-identified patent and that said Letters Patent is hereby corrected as shown below:

Please replace the old existing drawings with the new illustrating drawings that are attached here.

Signed and Sealed this

Twenty-sixth Day of May, 2009

John Doll

JOHN DOLL
*Acting Director of the United States Patent and Trademark Office*

(12) United States Patent
Rindsberg et al.

(10) Patent No.: US 7,035,628 B2
(45) Date of Patent: Apr. 25, 2006

(54) METHOD AND APPARATUS FOR CONTENT BLOCKING

(75) Inventors: Mark Rindsberg, Boca Raton, FL (US); Paul Marko, Boca Raton, FL (US); Jeffrey Malinsky, Fort Lauderdale, FL (US); Richard Andrew Michalski, Frederick, MD (US)

(73) Assignee: XM Satellite Radio, Inc., Washington, DC (US)

( * ) Notice: Subject to any disclaimer, the term of this patent is extended or adjusted under 35 U.S.C. 154(b) by 480 days.

(21) Appl. No.: 10/039,324

(22) Filed: Dec. 31, 2001

(65) Prior Publication Data

US 2003/0125033 A1 Jul. 3, 2003

(51) Int. Cl.
*H04M 3/00* (2006.01)

(52) U.S. Cl. ..................... 455/418; 455/419; 455/420; 348/722; 348/723; 375/221

(58) Field of Classification Search ............... 455/419, 455/418, 420, 45, 186.1, 507, 517, 524; 358/908; 348/722, 723, 732; 375/221
See application file for complete search history.

(56) References Cited

U.S. PATENT DOCUMENTS

| | | | | |
|---|---|---|---|---|
| 4,750,213 | A * | 6/1988 | Novak | 455/3.01 |
| 5,819,160 | A * | 10/1998 | Foladare et al. | 455/45 |
| 6,393,002 | B1 * | 5/2002 | Paneth et al. | 370/330 |
| 6,477,704 | B1 * | 11/2002 | Cremia | 725/35 |
| 6,553,077 | B1 * | 4/2003 | Rindsberg et al. | 375/260 |
| 6,700,926 | B1 * | 3/2004 | Heikkila et al. | 375/221 |
| 6,748,237 | B1 * | 6/2004 | Bates et al. | 455/553.1 |
| 6,785,656 | B1 * | 8/2004 | Patsiokas et al. | 704/500 |
| 6,865,373 | B1 * | 3/2005 | Tong et al. | 455/63.1 |
| 6,868,112 | B1 * | 3/2005 | Kim et al. | 375/147 |
| 2002/0055343 | A1 * | 5/2002 | Stetzler et al. | 455/260 |
| 2003/0031455 | A1 * | 2/2003 | Sagar | 386/35 |

* cited by examiner

*Primary Examiner*—Danh Cong Le
(74) *Attorney, Agent, or Firm*—Akerman Senterfitt

(57) ABSTRACT

A method of disabling at least a portion of one of a plurality of channels in a digital audio radio system includes the steps of receiving (702) a digitally encoded bit stream over-the-air on the plurality of channels and decoding (704) a selected channel among the plurality of channels. The method further comprises the steps of selectively tagging (706) an undesired type of content on the selected channel, analyzing (708) for an indication of content of the undesired type among the plurality of channels, and selectively disabling (710) at least the portion of the selected channel containing the undesired type of content.

14 Claims, 5 Drawing Sheets

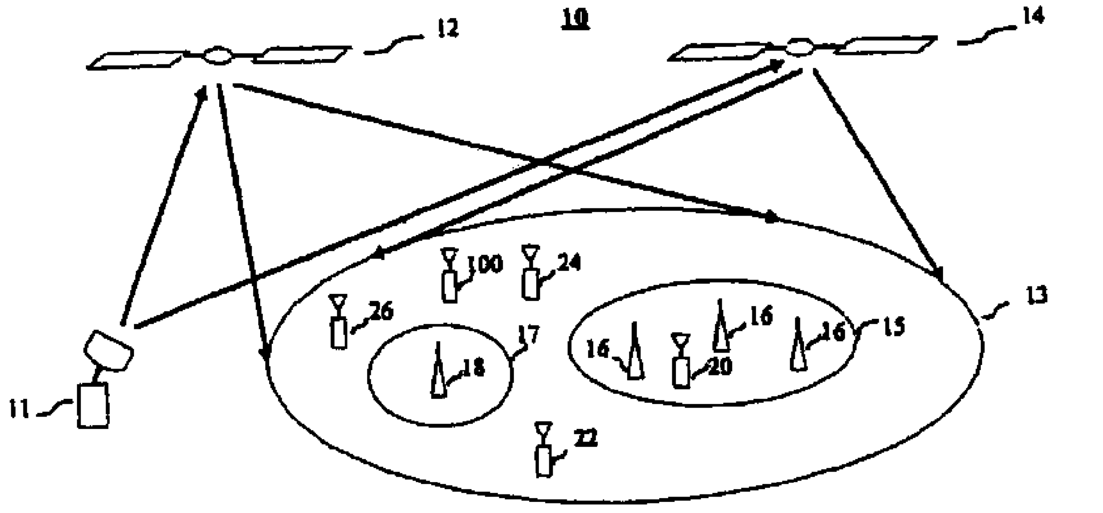

FIG. 4

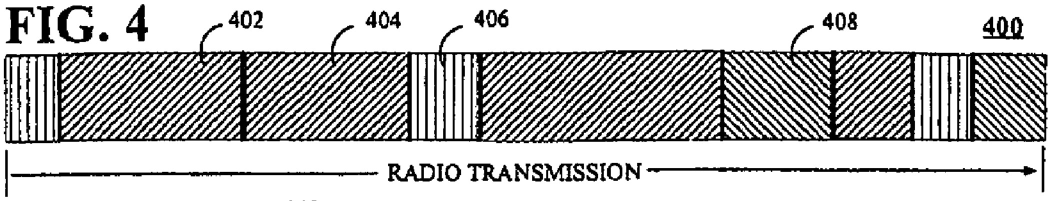

FIG. 5

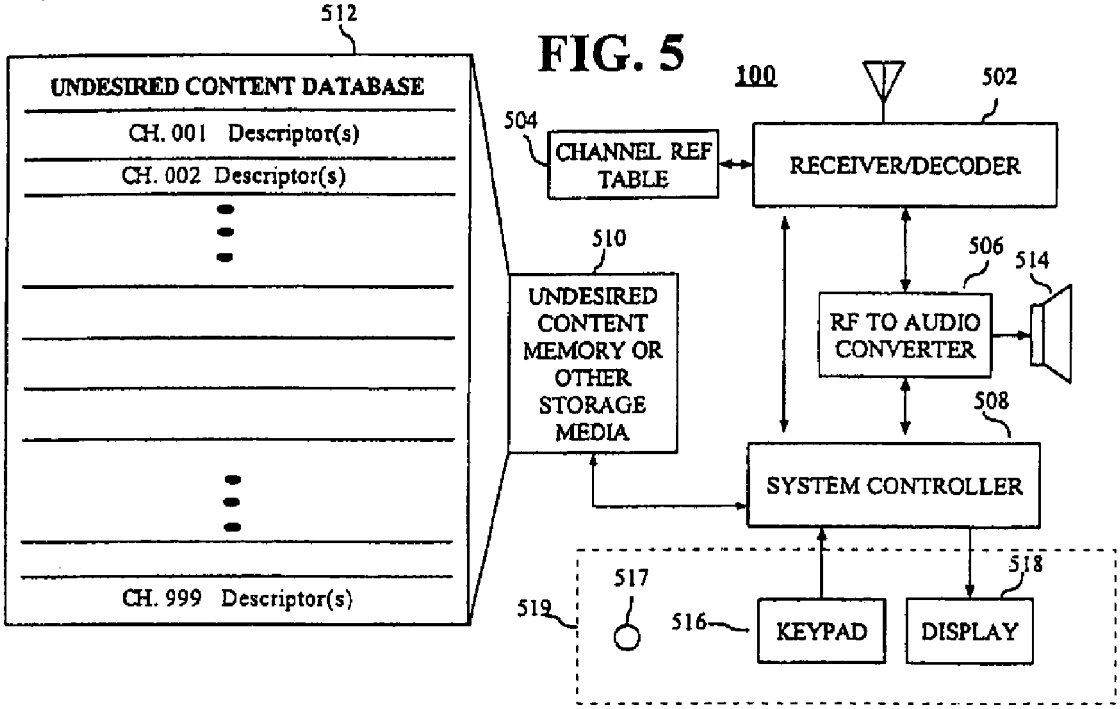

FIG. 6 504

| CHANNEL | ARTIST | ALBUM | TITLE | RATING | TIER | GUEST | HOST | LOCATION |
|---|---|---|---|---|---|---|---|---|
| | | | | | | | | |
| 1 | GERSHWIN | | RHAPSODY | A | PREMIUM | | | EAST |
| 2 | | | TALKSHOW | B | BASIC | RUSH | BUSH | ALL SOUTH |
| 3 | OUTKAST | | STANKONIA | D- | PREMIUM | | | S.Florida |
| 4 | BCH BOYS | | | ALL AUDS | BASIC | | | S.Cal |
| 5 | OLD DIRTY | | | ADULTS ONLY | BASIC | | | Don't Care |
| 6 | RAFFI | | BELUGA | KIDS ONLY | BASIC | | | Don't Care |
| 7 | CREED | | HUMAN CLA | B | BASIC | | | Don't Care |
| 8 | | | TALKSHOW | B- | BASIC | KING | OPRAH | Don't Care |
| 9 | | | MIA v. DC | | PREMIUM | | NFL | Not S.Fla. |
| . | | | | | | | | |
| . | | | | | | | | |
| . | | | | | | | | |
| N | MADONNA | | MUSIC | C | BASIC | | | |

700